Aug. 15, 1944.   J. S. PARSONS   2,356,083
ELECTRICAL DISTRIBUTION SYSTEM
Original Filed June 28, 1940   2 Sheets-Sheet 1

WITNESSES:
Edward Michaels
Wm. C. Groome

INVENTOR
John S. Parsons.
BY C. L. Friedman
ATTORNEY

Aug. 15, 1944.  J. S. PARSONS  2,356,083

ELECTRICAL DISTRIBUTION SYSTEM

Original Filed June 28, 1940  2 Sheets-Sheet 2

WITNESSES:
Edward Michaels
Wm. C. Groome

INVENTOR
John S. Parsons.
BY C. L. Freedman
ATTORNEY

Patented Aug. 15, 1944

2,356,083

UNITED STATES PATENT OFFICE 2,356,083

ELECTRICAL DISTRIBUTION SYSTEM

John S. Parsons, Wilkinsburg, Pa., assignor to Westinghouse Electric & Manufacturing Company, East Pittsburgh, Pa., a corporation of Pennsylvania Original application June 28, 1940, Serial No. 342,940. Divided and this application November 12, 1942, Serial No. 465,323

7 Claims. (Cl. 171—97)

This invention relates to electrical distribution systems and it has particular relation to network distribution systems of the type wherein a plurality of primary feeder circuits are employed for supplying energy to a common secondary network or grid circuit.

This application is division of my copending application, Serial No. 342,940 filed June 28, 1940, which has issued as Patent No. 2,329,132.

One of the major problems confronting the electrical industry is that of distributing, satisfactorily, alternating current to consumers in urban and medium density areas. Such distribution must not only provide reliable and continuous service, but the cost of the distribution system must justify its installation.

For more than ten years the most reliable alternating current distribution system for heavy density or urban areas has been that known as the Palmer system. In this system a plurality of high voltage primary feeder circuits are employed for supplying energy to a common low-voltage secondary network or grid circuit. Each of the feeder circuits is connected to the common network circuit through a plurality of network transformers and network protectors. Each of the protectors includes a directional relay for controlling the operation of the network protector. When a fault occurs on the network circuit, the flow of current to the fault does not actuate the directional relays and the fault is burned clear. The amount of energy available from the feeders is so large that generally no difficulty is encountered in burning clear faults occurring on the network circuit.

When a fault occurs on a feeder circuit, the flow of current through the directional relays associated with the feeder circuit actuates the relays and trips the network protectors to disconnect the faulted feeder circuit from the network circuit. The sound feeder circuits continue to supply energy to the network circuit and substantially no impairment of service results from a fault occuring on any feeder circuit.

Although the Palmer type network distribution system provides service of excellent reliability and continuity, its cost has justified its adoption only in areas having a heavy density of energy consumption such as the areas occurring in large cities.

In accordance with this invention, the conventional common network circuit or grid is replaced by a plurality of substantially independent secondary loop circuits. A plurality of primary feeder circuits are employed for supplying electrical energy through a plurality of network transformers to each of the loop circuits and the connections between the feeder circuits, and each of the loop circuits are so disposed that when any feeder circuit is removed from service the load on the loop circuit is distributed uniformly among the transformers associated with the remaining feeder circuits. By providing independent loop circuits, it is possible to isolate any loop without removing other loop circuits from service. Moreover, in starting operation on a dead or deenergized distribution system, it is possible to add loop circuits to the system successively as the condition of the system permits.

A further aspect of this invention comprises the replacement of the Palmer type network protector by inexpensive, rugged switches. Each of the network transformers is connected to its associated loop through a network switch which is designed to open only when substantially no current flows therethrough. Between each pair of network transformers a sectionalizing switch is placed in the loop circuit. The sectionalizing switches open in advance of the network switch when a fault occurs on a feeder circuit associated therewith. Since the feeder circuit also opens, the network switch is completely deenergized before it opens. Since the network switch does not open a circuit carrying current, its design may be appreciably simplified, and the network switch may, if desired, be placed in the casing of its network transformer. Moreover, due to the usual location of the sectionalizing switches midway between the two adjacent transformers, the fact that load is tapped off along the secondary loop circuit, and the fact that the transformer currents flow two ways from the transformers in the secondary loop circuit, each sectionalizing switch requires a current capacity of only 50 to 75% of the current rating of the largest adjacent network transformer.

If a switching system designed in accordance with this invention were applied to a conventional network circuit, one network switch and about one and one-half sectionalizing switches would be required for each network transformer. However, with the loop system, only one network switch and one sectionalizing switch are required for each network transformer. As above indicated, the design and relaying of these switches may be appreciably simpler than that provided in the conventional network protector.

It is, therefore, an object of this invention to provide a network switch of simple and rugged design.

It is a further object of the invention to provide an improved network switch energized from one side of a transformer in accordance with an electrical quantity present on the other side of the transformer.

It is an additional object of the invention to provide a network switch having control means energized under certain conditions from a first side of a transformer in accordance with an electrical quantity present on a second side of the transformer, and energized under other conditions in accordance with an electrical quantity present on the first side of the transformer.

Other objects of the invention will be apparent from the following description taken in conjunction with the accompanying drawings, in which.

Figure 1:
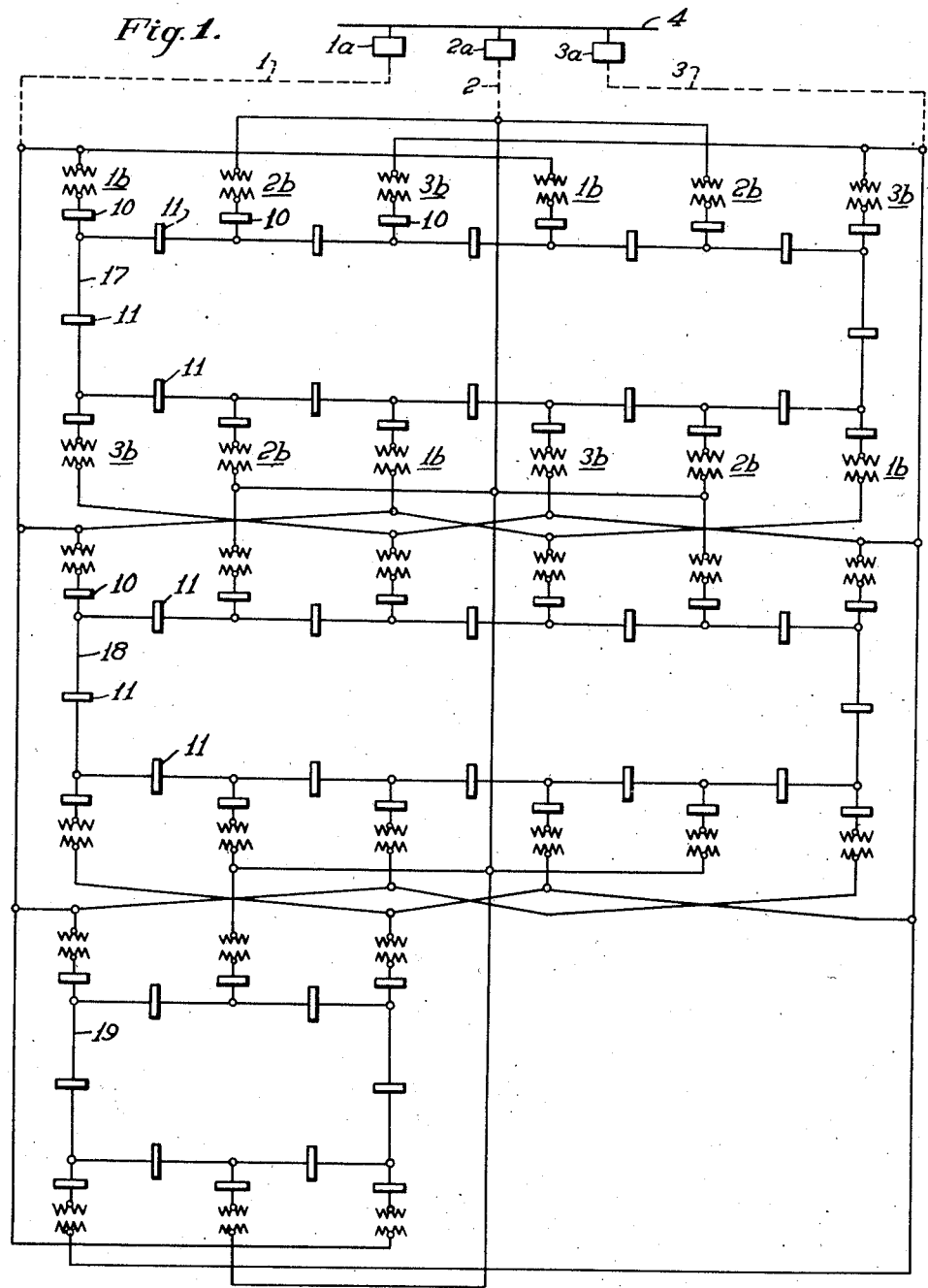
Figure 1 is a single-line diagrammatic view of a network distribution system.

Referring to the drawings, Fig. 1 represents a network distribution system. In this particular system, three feeders 1, 2 and 3 are shown for supplying electrical energy from one or more sources, here represented by a bus 4, to a suitable distribution circuit or circuits. Each of the feeder circuits is provided with a feeder circuit breaker 1a, 2a and 3a for controlling the connection to and disconnection from the bus 4 of the feeder circuits.

In Fig. 1, a network distribution system is illustrated which departs somewhat from the conventional Palmer system. The feeder circuits 1, 2 and 3 are connected through their associated network transformers 1b, 2b and 3b to a plurality of substantially independent low-voltage loop circuits 17, 18 and 19. These loop circuits may be of the same dimensions or of different dimensions as illustrated by the short loop circuit 19. The various network transformers may be connected to the loops through network protectors 10 which may be of the conventional Palmer type illustrated in my Patents 1,973,097, 1,997,597 and and 2,013,836. It will be understood that consumers of electrical energy are supplied with service from the various loop circuits.

To assure a uniform distribution of load among the various network transformers under different conditions, the network transformers are preferably connected to each loop circuit in an orderly sequence as illustrated in Fig. 1. Moreover, in each loop circuit the impedance of the loop circuit between any pair of adjacent network transformers is substantially equal to that of the loop circuit between any other pair of adjacent network transformers. This result may be obtained by proper spacing of the network transformers or by including reactors, if necessary, adjacent certain of the network transformers.

With the system illustrated in Fig. 1, if any of the feeder circuits such as the feeder circuit 1 is removed from service, the loads on the loop circuits will be divided evenly among the network transformers associated with the remaining feeder circuits.

Although the conventional network protectors such as those illustrated in my aforesaid patents provide ideal operation of the loop system illustrated in Fig. 1, such protectors are designed to open circuits carrying substantial current and their design is somewhat complicated and expensive. In order to simplify and reduce the cost of the network system, I have developed a complete new switching sequence which employs a transformer or network switch 10 which is designed to open a circuit carrying substantially no current.

Before actuation of the network switch 10 to its open condition, the network switch 10 is first isolated from any source of current. For this purpose each network switch 10 is separated from adjacent network switches by means of sectionalizing switches 11. When a fault occurs on any feeder circuit such as the feeder circuit 1, the sectionalizing switches 11 adjacent each of the network transformers 1b open in response to the excessive flow of current from the loop circuits to the faulted feeder circuit. In addition, the feeder circuit breaker 1a also opens and completely deenergizes the network transformers 1b and the network switches 10 associated therewith. The network switches 10 are responsive to the deenergized condition of the associated network transformers 1b and open with substantially no current flowing therethrough.

Preferably, the sectionalizing switches 11 close automatically after a time delay to restore the loop circuits to their original condition for energization from the sound feeder circuits 2 and 3. Under this condition of energization the load on the loop circuits is divided evenly among the network transformers 2b and 3b.

If a fault occurs on a loop circuit, it is desirable that the fault burn clear without necessitating the tripping of any network switch or sectionalizing switch. Since most faults occurring on a network circuit or loop circuit clear in approximately one or two seconds, by providing the sectionalizing switches 11 with a suitable time delay, faults occurring on the loop circuits are permitted to burn clear.

In Fig. 1, certain circuits are illustrated by diagonal lines. This illustration is for the purpose of facilitating the tracing of circuits and has no other significance.

The loop circuits illustrated in Fig. 1 may be either single-phase or polyphase. If single-phase they may be energized from a single-phase source or from a polyphase source. For example, if single-phase loop circuits are connected for energization from a three-phase source, one-third of the loop circuits would be connected for energization from each phase of the three-phase source. In such a system, by employing single-phase feeder circuit breakers, a failure of any phase will not impair service on the remaining operative phases.

If the switching system illustrated in Fig. 1 were employed on a conventional network or grid circuit, it would follow that substantially one network switch 10 and one and one-half sectionalizing switches 11 would be required for each network transformer. By adoption of the loop circuits illustrated in Fig. 1, this requirement is cut to one network switch 10 and one sectionalizing switch 11 for each network transformer.

As above indicated, a sectionalizing switch is located between two network transformers. Because of its location, the capacity of the sectionalizing switch need be only 50 to 75% of the capacity of the largest of the two adjacent network transformers. The sectionalizing switch is designed to trip for a flow of power in either direction therethrough. Moreover, the sectionalizing switch is designed to reclose when a suitable voltage is present on either side of the switch. A suitable construction is illustrated in Fig. 2.

Figure 2:
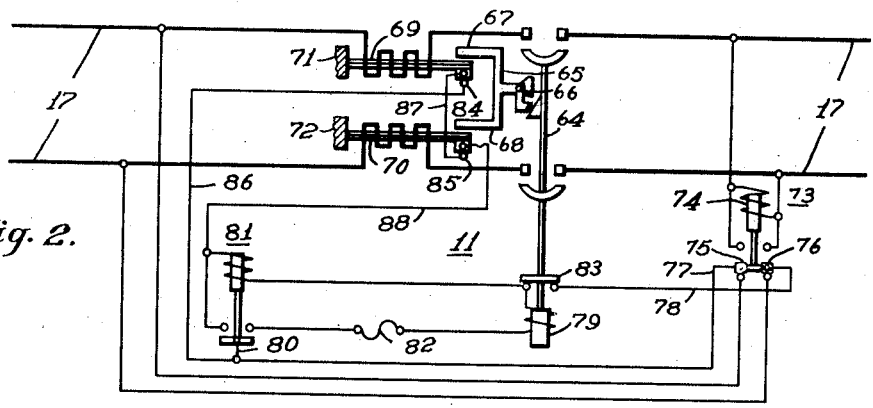
Fig. 2 is a diagrammatic view of a sectionalizing switch suitable for the system illustrated in Fig. 1.

Referring to Fig. 2, the sectionalizing switch 11 includes a circuit breaker 64 for connecting two portions of the loop circuit 17. The circuit breaker 64 is maintained in a closed position by means of a latch 65 which is pivoted for rotation about a point 66. The latch 65 is provided with two tripping legs 67 and 68 which are positioned in the paths of travel of two thermal elements 69 and 70. These thermal elements are designed to be heated by current flowing in the conductors of the loop circuit 17. Although heat for the thermal elements may be provided in various manner, in the illustration, current passing through the conductors of the loop circuit 17 passes directly through the heaters of the thermal elements. As the thermal elements heat, they tend to rotate about fixed supports 71 and 72 into engagement with the tripping legs 67 and 68. The thermal elements may take various forms, but as illustrated, they are bimetallic elements.

Excessive current may flow through the heaters for the thermal elements either for an internal loop circuit fault or for an external feeder circuit fault. Ordinarily it is desirable that internal or loop circuit faults burn themselves clear. Most of these internal faults will burn clear in one or two seconds. Consequently, the thermal elements 69 and 70 are provided with a time delay, preferably an inverse time delay, with a minimum operating time of two to two and one-half seconds when maximum current flows to a fault occurring in the secondary or loop circuit 17. This provides adequate time for clearance of the usual secondary or loop circuit fault. The thermal elements 69 and 70 may be adjusted to trip the circuit breaker 64 in response to current in excess of 60 to 100% of the full load current of the larger of the two network transformers adjacent the sectionalizing switch 11.

For automatically closing the sectionalizing switch 11, it is desirable that the circuit breaker 64 close when sufficient voltage is present on either side of the circuit breaker. To this end a transfer relay 73 is provided for energizing the closing circuit of the circuit breaker 64 from either side of the circuit breaker. In the form illustrated, the transfer relay includes a solenoid 74 which is connected for energization in accordance with the voltage present on one side of the circuit breaker 64. This transfer relay is adjusted to pick up and close its front contacts when energized by a voltage greater than 70 to 75% of normal. It is designed to drop and engage its back contacts when the energizing voltage drops below 25 to 50% of normal. The front contacts are connected to the loop circuit 17 on one side of the circuit breaker 64 and the back contacts are connected to the loop circuit 17 on the opposite side of the circuit breaker 64. In the form illustrated, the transfer relay 73 is provided with a movable contact member having two insulated contacts 75 and 76 for selectively engaging the front or back contacts of the relay. The movable contacts 75 and 76 are connected through suitable conductors 77 and 78 to energize the closing mechanism of the circuit breaker 64. It will be observed that if the voltage applied to the solenoid 74 is in excess of 70 to 75% of normal, the conductors 77 and 78 are connected, respectively, to the conductors of the loop circuit 17 on the right of the circuit breaker 64. If the voltage applied to the solenoid 74 drops below 25 to 50% of normal, the conductors 77 and 78 are connected, respectively, to the conductors of the loop circuit on the left of the circuit breaker 64. Consequently, the closing circuit for the circuit breaker will be energized even though either portion of the loop circuit is deenergized.

Reclosure of the circuit breaker 64 is effected through a closing motor or solenoid 79. The closing circuit for the solenoid 79 may be traced from the movable contact 75 through the conductor 77, a conductor 80, contacts of a closing relay 81, a fuse 82, the solenoid 79, a pallet switch 83 carried by the circuit breaker 64, and the conductor 78 which is connected to the second movable contact 76.

In order to provide adequate time for operation of the network switches 10, it is desirable that the circuit breaker 64 be closed only after the expiration of a suitable time delay such as four to six seconds. In the embodiment illustrated in Fig. 2, this time delay is provided by the thermal elements 69 and 70 which have back contacts 84 and 85. After an actuation of either of the thermal elements 69 and 70 into tripping condition, a delay of four to six seconds is required before the thermal elements reengage their back contacts 84 and 85. These back contacts are included in the closing circuit for the circuit breaker 64.

The energizing circuit for the closing relay 81 may be traced from the movable contact 75 through the conductor 77, a conductor 86, the back contact 84, a conductor 87, the back contact 85, a conductor 88, the solenoid of the closing relay 81, the pallet switch 83 and the conductor 78 back to the second movable contact 76. This closing relay 81 is adjusted to close its front contacts, and seal itself closed, in response to a voltage above approximately 80% to 85% of normal. When the closing relay 81 operates to close its front contacts, it establishes a closing circuit for the closing solenoid 79, as above described.

If a fault occurring on the secondary or loop circuit 17 should persist for more than two or two and one-half seconds, the circuit breaker 64 closes and trips at intervals of approximately six to eight seconds. If it is desired to eliminate excessive operation or "pumping" of the circuit breaker 64 under these circumstances, a fuse 82 may be included in the closing circuit of the circuit breaker. This fuse may be so proportioned that it blows and opens the closing circuit after six to twelve immediately consecutive operations of the circuit breaker 64 in response to the cumulative intermittent energization thereof. This should provide ample opportunity for any usual secondary or loop circuit fault to burn itself clear.

Figure 3:
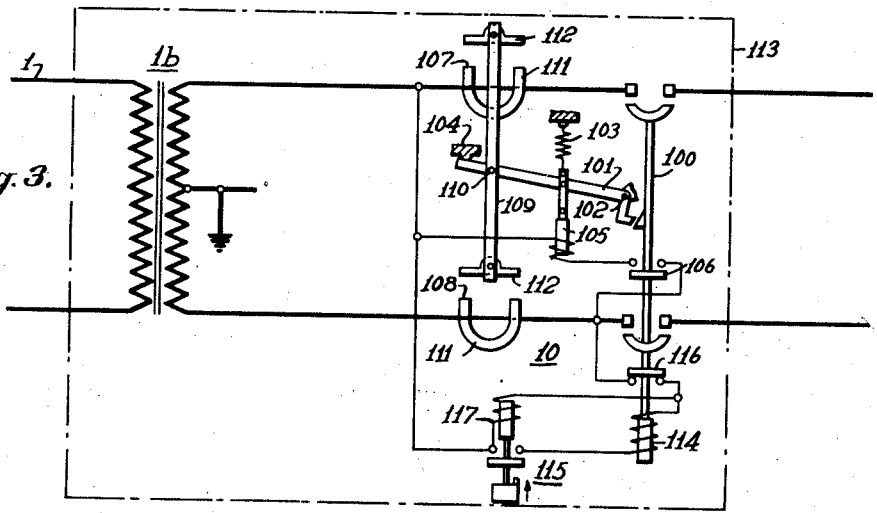
Fig. 3 is a diagrammatic view of a network switch which is suitable for the system illustrated in Fig. 1.

The network switch 10 is designed to open only when substantially no current flows therethrough. A suitable construction for this purpose is illustrated in Fig. 3, wherein a circuit breaker 100 is employed for controlling the connection of the network transformer 1b to a loop circuit. The circuit breaker 100 is latched in its closed position by means of a suitable tripping lever 101 which is pivoted for rotation about a fixed axis 102. A spring 103 is employed for biasing the tripping lever 101 towards its tripping position against a stationary stop 104.

Under normal conditions of operation, the tripping lever 101 is maintained in its latching position by means of a voltage responsive solenoid 105, which is connected across the secondary of the network transformer 1b through the front contacts of a pallet switch 106 carried by the circuit breaker. The solenoid 105 is so designed that when the voltage thereacross falls below approximately 25 to 30% of its normal value, the spring 103 rotates the tripping lever 101 into its tripping position.

Referring to Fig. 1, when the sectionalizing switches 11 adjacent a network switch 10 associated with a transformer 1b open, and when the feeder circuit breaker 1a opens in response to a fault occurring on the feeder circuit 1, the network switch 10 is completely deenergized. Under these conditions, the voltage across the solenoid 105 of Fig. 3 drops below 25 to 30% of its normal value, and the circuit breaker 100 trips to disconnect the transformer 1b from its loop circuit. It should be noted that under these conditions substantially no current flows through the circuit breaker 100.

If the tripping of the circuit breaker 100 is controlled only by an undervoltage control device, the circuit breaker may open when carrying substantial current under some fault conditions. For example, when a fault occurs on a loop circuit adjacent the circuit breaker 100, the voltage across the solenoid 105 may fall well below 25 to 30% of its normal value. Consequently, the circuit breaker 100 will trip while carrying the full fault current. If the circuit breaker is designed for such operations, no harm results. However, as above explained, it is desirable that the circuit breaker 100 open only while carrying substantially no current. It is also desirable that circuit breaker 100 remain closed so that transformer 16 may supply current to the fault to assist in burning it clear. To this end, a current-responsive device is provided in Fig. 3 for assisting the solenoid 105.

The current-responsive device may take the form of two electromagnets 107 and 108 which control a link 109 pivotally attached to the tripping lever 101 by means of a pin 110. Each of the electromagnets may comprise a U-shaped magnetic member 111 which may be of laminated soft iron or steel. Each of the U-shaped magnetic members is positioned with its legs substantially surrounding one of the main conductors associated with the secondary of the network transformer 1b. Each magnetic member 111 is provided with a magnetic armature 112 attached to the link 109.

The electromagnets 107 and 108 may be so designed that with current in excess of three to five times normal rated load current flowing through the circuit breaker 100 and with zero voltage across the solenoid 105, the tripping lever 101 is maintained in its latching position against the bias of the spring 103. The electromagnets 111 and solenoid 105 cooperate to prevent opening of the circuit breaker 100 when substantial current flows therethrough. This greatly facilitates the placement of the network switch 10 and the network transformer 1b in a common casing, represented in Fig. 3 by a broken line 113. The circuit breaker 100 may be immersed in the insulating and cooling liquid employed for the transformer 1b.

For maximum economy, the network switch 10 may be provided only with a manual reclosing structure. For completeness, however, I have illustrated in Fig. 3 a simple reclosing mechanism therefor. Generally, a reclosing mechanism is preferable. In Fig. 3, the circuit breaker 100 is provided with a closing motor or solenoid 114 which may be connected across the secondary of the transformer 1b through the front contacts of a timing relay 115 and the back contacts of a pallet switch 116 carried by the circuit breaker. When the circuit breaker trips, the back contacts of the pallet switch 116 close to connect the operating coil 117 of the timing relay 115 across the secondary of the network transformer 1b. At the end of a predetermined time delay, such as three to six seconds, the front contacts of the timing relay close to connect the closing solenoid 114 across the secondary of the transformer. The parts may be so proportioned that the circuit breaker closes with a three to six second time delay when voltage in excess of approximately 90% of the normal voltage appears across the secondary of the transformer.

The purpose of the time delay relay is to prevent reclosure of the network switch 10 during those periods when the feeder circuit breaker associated with the feeder circuit 1 is closed on a reclosing cycle. On a typical reclosing cycle a feeder breaker may be reclosed first instantaneously, second, after a ten second delay, and third, after a fifteen second delay followed by a lockout of the circuit breaker if the fault on the feeder circuit does not clear during a portion of the reclosing cycle. With such a setting of the feeder circuit breaker, the timing relay should completely reset in somewhat less than ten seconds, for example, in about eight seconds. To this end the time relay may interpose a time delay of three to six seconds in the closing of the network switch and may reset for a subsequent operation in approximately eight seconds or less. With such a timing of the relay the full delay of three to six seconds, to prevent reclosing while the feeder breaker is closed during its reclosing cycle, is available at the beginning of each reclosure of the feeder circuit breaker and the network switch will not close unless the feeder circuit breaker closes and remains closed.

As above indicated, the network switch 10 may be made manually reclosing for maximum economy. When a tripping mechanism, similar to that illustrated in Fig. 3, is employed, satisfactory operation of the network switch 10 is assured, but under some conditions certain inconvenience may result from operation thereof if manual reclosing is used. Referring to Fig. 1, let it be assumed that all sources of energy connected to the bus 4 are intentionally disconnected. Under these conditions, the entire network distribution system is deenergized, and all of the network switches 10 trip to disconnect the deenergized feeder circuits from the associated loop circuits. If these network switches 10 are of the manual reclosing type, each switch must be manually reclosed when the network distribution system is again placed in operation. The manual reclosing of each network switch 10 results in substantial inconvenience and unnecessary delay in the restoration of service. A manually reclosed network switch which does not trip when the entire network distribution system is deenergized is disclosed and claimed in my Patent 2,329,132.

Figure 4:
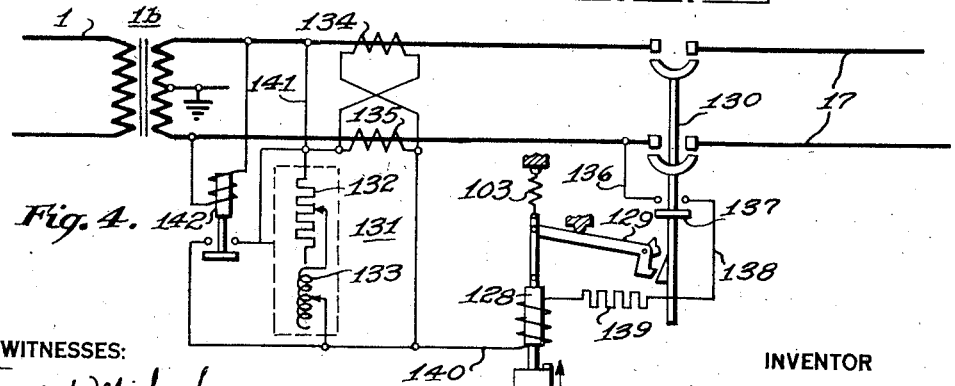
Fig. 4 is a diagrammatic view of a further modification of a network switch.

In the network switches thus far described, a current-responsive control member is employed for preventing the tripping of the circuit breaker when a fault occurs adjacent thereto on the associated loop circuit. By proper compensation of the voltage applied to the solenoid 105 of Fig. 3, it is possible to control the tripping of the circuit breaker by means of the solenoid alone. Fig. 4 illustrates such a construction wherein a single solenoid 128 is employed for controlling a tripping lever 129 for a circuit breaker 130. The solenoid 128 may be energized from the secondary of the network transformer 1b in accordance with the voltage present on the feeder circuit 1. For this purpose, a compensator 131, illustrated as consisting of an adjustable resistor 132 and an adjustable reactance 133, is energized in accordance with the current flowing in the secondary of the network transformer by means of two current transformers 134 and 135. The impedance of the compensator 131 is so proportioned that the current flowing therethrough produces a voltage drop thereacross which is proportional to the voltage drop across the transformer 1b. The energizing circuit for the solenoid 128 may be traced from one terminal of the transformer secondary through a conductor 136, the front contacts of a pallet switch 137 carried by the circuit breaker, a conductor 138, a resistor 139, the energizing coil of the solenoid 128, a conductor 140, the compensator 131 and a conductor 141 to the other main terminal of the secondary winding. From an inspection of this circuit it will be noted that the voltage across the solenoid 128 is proportional to the secondary voltage of the transformer plus the voltage represented by the drop across the compensator 131. Consequently, the solenoid 128 will be energized in accordance with the voltage present on the feeder circuit 1.

Should a fault occur on a loop circuit adjacent the circuit breaker 130, the voltage across the secondary of the transformer 1b may drop to a negligible value. However, the voltage drop across the compensator 131 rises to a substantial value corresponding to the drop across the transformer 1b, and the solenoid 128 consequently will remain energized by a substantial voltage. With a fault on the loop circuit, the voltage on the feeder circuit 1 rarely falls below approximately 50% of its normal value. Such a value is well above the voltage dropout setting for the solenoid 128, which may be 25 to 30% of normal voltage. When the network transformer and the adjacent sections of the loop circuit 17 are completely deenergized, the voltage across the solenoid 128 falls below 25 to 30% of the normal feeder circuit voltage, and the spring 103 operates to move the tripping lever 129 to its tripping position.

Under the conditions thus far described, the circuit breaker 130 may trip while carrying substantial current. For example, if a fault occurs on the feeder circuit 1 adjacent the network transformer 1b, the voltage across the solenoid 128 may drop to a low value, thereby permitting the circuit breaker 130 to trip. Such tripping would be under conditions wherein the circuit breaker carries substantial current. Here again, such tripping is permissible if the circuit breaker is designed for such operation, but preferably the controls should be such that the circuit breaker does not open while carrying substantial current.

To prevent this undesirable operation of the circuit breaker 130, a relay 142 may be provided for short-circuiting the compensator 131. This relay 142 is energized in accordance with the voltage across the secondary of the network transformer 1b. When the voltage applied to the relay 142 rises above a predetermined value, the relay picks up to close its front contacts, thereby short-circuiting the compensator 131 and energizing the solenoid 128 in accordance with the voltage across the secondary of the transformer 1b. While the voltage across the secondary of the transformer is above the dropout value for the relay 142, the solenoid 128 is energized in accordance with the secondary voltage to maintain the tripping lever 129 in its latching position.

If a fault occurs on a secondary loop circuit adjacent the circuit breaker 130, the voltage across the relay 142 may drop to substantially zero. Consequently, the relay 142 opens its contacts to place the compensator 131 in operation. Because of the operation of the compensator, the voltage across the solenoid 128 becomes proportional to that present in the feeder circuit 1, and the circuit breaker 130 consequently does not open as long as this voltage is present.

Should a fault occur on the feeder circuit 1, the voltage across the secondary of the transformer 1b remains above the dropout setting for the relay 142. The solenoid 128 continues to be energized in accordance with the voltage across the secondary of the transformer 1b, and this is sufficient to prevent tripping of the circuit breaker 130.

Preferably, the dropout voltage for the solenoid 128 should be as low as possible when employed with the relay 142. For example, a dropout at 10 to 15% of normal voltage is preferable to a dropout at 25 to 30% of the normal voltage. This may be obtained by making the resistor 139 of a material having a high positive temperature coefficient of resistance. Such a resistance may be obtained by employing tungsten therefor in the form of one or more lamps. The relay 142 may have a dropout setting approximately 5 to 10% above the maximum dropout voltage of the solenoid 128. In order to assure dropout of the relay 142 in advance of operation of the solenoid 128, the solenoid may be provided with a slight time delay in its tripping direction.

From the foregoing discussion it is believed that the operation of a distribution system similar to that disclosed in Fig. 3 is apparent. A detailed discussion of the operation of such a system is set forth in my Patent 2,329,132.

Although I have described the invention with reference to certain specific embodiments thereof, numerous modifications thereof are possible. Therefore, I do not desire the invention to be restricted except as required by the appended claims when interpreted in view of the prior art.

I claim as my invention:

1. In an electrical distribution system, an electrical circuit, impedance means in said electrical circuit for producing on a first side of said impedance means an electrical quantity differing from an electrical quantity present on a second side of said impedance means, control means for said electrical circuit, means for energizing said control means in accordance with the electrical quantity present on said first side of said impedance means, and means responsive to a predetermined condition of said electrical circuit for energizing said control means in accordance with the electrical quantity present on the second side of said impedance means.

2. In an electrical distribution system, an electrical circuit, impedance means in said electrical circuit for producing on a first side of said impedance means an electrical quantity differing from a related electrical quantity present on a second side of said impedance means, control means for said electrical circuit, means for energizing said control means in accordance with the electrical quantity present on said first side of said impedance means, means for deriving from the first side of said impedance means an auxiliary energization dependent on the difference in said electrical quantities, and means responsive to a predetermined condition of said electrical circuit for additionally energizing said control means in accordance with said auxiliary energization.

3. In an electrical distribution system, an electrical circuit, a transformer having a primary and a secondary operatively connected in said electrical circuit, control means for said electrical circuit, means connecting said control means for energization from the secondary of said transformer, means for deriving auxiliary energization from said secondary, and means responsive to a decrease of said first-named energization below a predetermined value for energizing said control means by said auxiliary energization.

4. In an electrical distribution system, an electrical circuit, a transformer having a primary and a secondary operatively connected in said electrical circuit, control means for said electrical circuit, means connecting said control means for energization from the secondary of said transformer, means for deriving from said secondary an auxiliary voltage substantially dependent on the voltage drop across said transformer, and means responsive to a decrease in the secondary voltage of said transformer below a predetermined value for additionally energizing said control means in accordance with said auxiliary voltage.

5. In an electrical distribution system, a transformer, a feeder circuit for normally energizing said transformer, a distribution circuit, switch means for controlling the connection of said distribution circuit to said feeder circuit through said transformer, compensating means connected to said distribution circuit for producing an auxiliary voltage which when added to the voltage of the distribution circuit provides a resultant voltage substantially proportional to the voltage of said feeder circuit, control means for said switch means, means for energizing said control means by the voltage of said distribution circuit, and means responsive to a predetermined range of the voltage of said distribution circuit for energizing said control means by said resultant voltage.

6. In an electrical distribution system, a transformer, a feeder circuit for normally energizing said transformer, a distribution circuit, switch means for controlling the connection of said distribution circuit to said feeder circuit through said transformer, compensating means connected to said distribution circuit for producing an auxiliary voltage which when added to the voltage of the distribution circuit provides a resultant voltage substantially proportional to the voltage of said feeder circuit, means for tripping said switch means, means for energizing said tripping means from said distribution circuit and from said compensating means substantially in accordance with the voltage of said feeder circuit, and overvoltage control means responsive to the voltage of said distribution circuit for rendering said compensating means ineffective, whereby for voltages of said distribution circuit above a predetermined value said trippings means is energized in accordance with the voltage of said distribution circuit.

7. In an electrical distribution system, a transformer, a feeder circuit for normally energizing said transformer, a distribution circuit, switch means for operatively connecting said distribution circuit for energization from said feeder circuit through said transformer, tripping means responsive after a predetermined time delay to undervoltage for tripping said switch means, means for energizing said tripping means in accordance with a first voltage on the distribution circuit side of said transformer, compensating means for adding to said voltage an increment substantially proportional to the voltage drop across said transformer, and means responsive to a predetermined value of said first voltage of rendering said compensating means ineffective.

JOHN S. PARSONS.